US010625656B1

(12) United States Patent
Golden (10) Patent No.: US 10,625,656 B1
(45) Date of Patent: Apr. 21, 2020

(54) SYSTEM AND METHOD FOR ENHANCING FAN EXPERIENCE WHEN ATTENDING A SPORTING EVENT SUCH AS A FOOTBALL GAME OR A MUSIC CONCERT AT A STADIUM

(71) Applicant: W. Brian Golden, Scranton, PA (US)

(72) Inventor: W. Brian Golden, Scranton, PA (US)

(*) Notice: Subject to any disclaimer, the term of this patent is extended or adjusted under 35 U.S.C. 154(b) by 0 days.

(21) Appl. No.: 16/430,795

(22) Filed: Jun. 4, 2019

(51) Int. Cl.
*A63G 21/08* (2006.01)
*E04H 3/12* (2006.01)
*B60P 3/34* (2006.01)
*A63G 31/08* (2006.01)
*B61B 1/02* (2006.01)
*B61D 1/04* (2006.01)
*B61B 13/00* (2006.01)

(52) U.S. Cl.
CPC ............... *B60P 3/34* (2013.01); *A63G 31/08* (2013.01); *B61B 1/02* (2013.01); *B61B 13/00* (2013.01); *B61D 1/04* (2013.01); *E04H 3/12* (2013.01)

(58) Field of Classification Search
CPC .. E04H 3/12; A63G 31/08; B61P 1/02; B61D 1/04; A61J 2005/002; A61J 2005/001; A61J 2005/12; A61J 9/00; A63K 3/00; B60R 2021/0097
USPC .......... 104/53, 18, 20, 106, 107, 238.1, 330, 104/331; 472/43, 92, 94
See application file for complete search history.

(56) References Cited

U.S. PATENT DOCUMENTS

| | | | | | |
|---|---|---|---|---|---|
| 2,348,841 | A | * | 5/1944 | Andrew | G03B 15/00 352/132 |
| 2,573,350 | A | * | 10/1951 | Miller | G03B 15/00 352/132 |
| 2,719,471 | A | * | 10/1955 | Aspden | B66F 11/048 396/428 |
| 2,746,396 | A | * | 5/1956 | Davis | A63K 3/00 104/75 |
| 3,002,234 | A | * | 10/1961 | Waterbury | E04H 3/12 52/9 |
| 3,469,355 | A | * | 9/1969 | McGann, Jr. | B60P 3/423 52/8 |

(Continued)

OTHER PUBLICATIONS https://www.youtube.com/watch?time_continue=7&v=BReGYryjhNg, Monster Jam, Monster Jam VIP Experiences, Published Feb. 22, 2018. (Year: 2018).*

(Continued)

*Primary Examiner* — Kyle J. Walraed-Sullivan
(74) *Attorney, Agent, or Firm* — John F. A. Earley, III; Harding, Earley, Follmer & Frailey, P.C.

(57) ABSTRACT

System for enhancing fan experience comprises a stadium having a field area, a pathway extending along at least a portion of the field area, and a vehicle adapted to move along the pathway, the vehicle being adapted to transport sports fans situated within the vehicle simultaneously along the pathway during a sports event or concert go-ers situated within the vehicle simultaneously along the pathway during a music concert, to provide a view to the sports fans riding in the vehicle from amongst and/or in close proximity to the players in a sideline area on the field area during a sports event, and to provide a view to concert go-ers riding in the vehicle from close proximity to a stage located on the field area and the performers on the stage during a music concert.

40 Claims, 10 Drawing Sheets

(56) References Cited

U.S. PATENT DOCUMENTS

| | | | | |
|---|---|---|---|---|
| 3,613,546 | A * | 10/1971 | Richardson | F16M 11/42 396/428 |
| 3,735,710 | A * | 5/1973 | Hickman | B61B 13/127 104/168 |
| 3,752,531 | A * | 8/1973 | Jones | B60P 3/0252 296/64 |
| 3,774,542 | A * | 11/1973 | Walsh | B61B 3/02 104/89 |
| 3,804,022 | A * | 4/1974 | Schwarzler | B60L 13/04 104/284 |
| 3,861,315 | A * | 1/1975 | Rypinski | B61B 15/00 104/18 |
| 3,987,734 | A * | 10/1976 | Horn | B61B 12/02 104/88.03 |
| 5,105,915 | A * | 4/1992 | Gary | A61G 3/063 14/71.3 |
| 5,623,878 | A | 4/1997 | Baxter et al. | |
| 5,629,595 | A | 5/1997 | Salter et al. | |
| 5,921,032 | A * | 7/1999 | Labinski | E04H 3/12 52/10 |
| 6,066,049 | A * | 5/2000 | Milanian | A63G 3/06 472/128 |
| 6,182,576 | B1 * | 2/2001 | Svensson | B60L 5/38 104/118 |
| 6,321,657 | B1 * | 11/2001 | Owen | B61B 1/02 104/119 |
| 6,341,564 | B1 | 1/2002 | Ochi | |
| 6,715,425 | B1 * | 4/2004 | Dore | A63K 3/00 104/53 |
| 7,607,843 | B2 * | 10/2009 | Gluck | G03B 17/00 348/157 |
| 7,690,473 | B2 * | 4/2010 | Hammonds | B62D 33/063 180/326 |
| 8,347,556 | B2 | 1/2013 | Stelmaszek et al. | |
| 8,943,975 | B2 | 2/2015 | Gmeinwieser et al. | |
| 9,914,494 | B1 | 3/2018 | Meyer | |
| 10,065,129 | B2 | 9/2018 | Hoddle | |
| 10,248,120 | B1 * | 4/2019 | Siegel | G05D 1/0088 |
| 2004/0010981 | A1 * | 1/2004 | Kennedy | B32B 3/02 52/6 |
| 2006/0042497 | A1 * | 3/2006 | Yamada | B61B 1/00 104/18 |
| 2006/0135272 | A1 * | 6/2006 | Liggett | A63G 31/02 472/92 |
| 2006/0293103 | A1 * | 12/2006 | Mendelsohn | G06Q 30/02 463/42 |
| 2007/0193123 | A1 * | 8/2007 | Magpuri | E04H 3/22 52/8 |
| 2009/0019785 | A1 * | 1/2009 | Figueras Mitjans | A47C 1/12 52/10 |
| 2009/0320713 | A1 * | 12/2009 | Amiri | B61B 13/00 104/281 |
| 2010/0139176 | A1 | 6/2010 | Flueck et al. | |
| 2010/0146869 | A1 * | 6/2010 | Stelmaszek | E04H 3/12 52/9 |
| 2015/0131082 | A1 * | 5/2015 | Van Der Velde | G01S 7/4806 356/28 |
| 2016/0370801 | A1 * | 12/2016 | Fairfield | G05D 1/0044 |
| 2017/0175409 | A1 * | 6/2017 | Canavati | E04H 3/02 |
| 2017/0326469 | A1 * | 11/2017 | Hoddle | A63J 1/00 |
| 2018/0022405 | A1 * | 1/2018 | Gecchelin | B60D 1/36 701/23 |

OTHER PUBLICATIONS https://www.youtube.com/watch?time_continue=7&v=BReGYryjhNg, The Comeback, ESPN Officially Kills the Booger Mobile, Mar. 7, 2019 (Year: 2019).*

* cited by examiner

SYSTEM AND METHOD FOR ENHANCING FAN EXPERIENCE WHEN ATTENDING A SPORTING EVENT SUCH AS A FOOTBALL GAME OR A MUSIC CONCERT AT A STADIUM

FIELD OF THE INVENTION

The present invention relates to spectator venues, such as stadiums where football games are played or music concerts are performed, and more particularly concerns (1) a venue for enhancing spectator (e.g., sports fan, music fan, and the like) experience when attending an event such as a football game or a music concert, and (2) a method for enhancing spectator experience when attending an event such as a football game or a music concert.

BACKGROUND OF THE INVENTION

A spectator of an event at a venue (e.g., a sport fan attending a football game being played at a stadium, or a music fan attending a music concert being performed at a stadium, that is, a stadium concert) that has a good experience attending the event likely results in a spectator that is happy and satisfied about attending the event, and a happy, satisfied spectator is likely to lead to repeat business from the spectator (e.g., the spectator attending future similar events at the venue), and possible new business from the spectator's friends who the spectator has told about his good experience in attending the event at the venue.

The experience that a spectator has attending a sporting event is commonly referred to (and used in this application) as "sport fan experience." The term "sports fan experience" is used to describe what the spectator attending a sporting event encounters, does, and can do at the sporting event. Similarly, as used herein, the term "fan experience" is used to describe what a spectator attending an event, such as a music concert at a stadium, encounters, does, and can do at the event.

Enhancing the experience of a spectator attending an event at a venue, such as enhancing the experience (e.g., enhancing the sports fan experience) of a sports fan attending a football game at a stadium, or such as enhancing the experience of a fan (e.g., enhancing the fan experience) attending a music concert at a stadium, likely results in a more satisfied spectator, who not only is likely to attend future like events at the venue (creating repeat business for the venue operator), but also is likely willing to pay more money to obtain an enhanced experience, both the repeat business and the willingness to spend more money to obtain an enhanced experience leading to more revenue for the entity (entities) that owns (own) the venue and/or produce the events at the venue.

To enhance sports fan experience at stadiums and music fan experience at music concerts at stadium, stadium operators have provided amenities and features such as luxury boxes or suites, wi-fi, computer apps associated with the event, recreational areas, fireworks, brand name concessionaries, bars, tailgating areas, party/socializing decks, pools, and lazy rivers to swim in, and even stadium pool bars to cool-off in while enjoying a beverage at the stadium, to provide fans (e.g., spectators at stadium events) with non-traditional experiences while attending a stadium event, which are intended to result in each fan having a better, more satisfying fan experience than a fan attending a stadium event that does not have such fan experience enhancing amenities and features.

Stelmaszek U.S. Pat. No. 8,347,556 and Hoddle U.S. Pat. No. 10,065,129, both of which are incorporated herein by reference, have proposed enhancing fan experience of fans attending stadium events by providing a stadium with a dynamic seating area. In these patents, a dynamic seating area is obtained by providing seating platforms (that are provided with seats), or pods (that are provided with seats), wherein the seating platform or pods move along a track formed in the stands (i.e., the seating area overlooking the sports field) of the stadium. While Stelmaszek's and Hoddle's proposals provide spectators with a constantly changing view of the playing field from the grandstands of the stadium, their proposals fail to provide a view from amongst the players and coaches.

SUMMARY OF THE INVENTION

It is an object of the invention to provide a system and a method for enhancing sports fan experience of spectators attending a sporting event at a stadium.

It is another object of the invention to provide a system and a method for enhancing fan experience of spectators attending an entertainment event at a stadium.

Another object of the invention is to enhance the experience of spectators attending an event at a stadium by placing such spectators amongst the performers (for example, players and coaches of a sporting event, or, for example, musicians at a concert) during the event, without interfering with the performers and with little or no hinderance of the view of the spectators watching the event from the grandstands of the stadium.

Still another object of the invention is to provide a system that generates additional revenue for stadium operators due to the system being a feature or amenity of the stadium that spectators would be willing to pay extra for in view of the enhanced experience the system provides to spectators.

These and other objects are provided by my invention which is set-out below.

DETAILED DESCRIPTION

Turning now to the drawings, there is shown in FIGS. 1, 2, 4-9, and 19 some preferred embodiments of my invention. Here, there is shown my inventive system 11 for enhancing sports fan experience when attending a sporting event, such as a football game.

Figure 1:
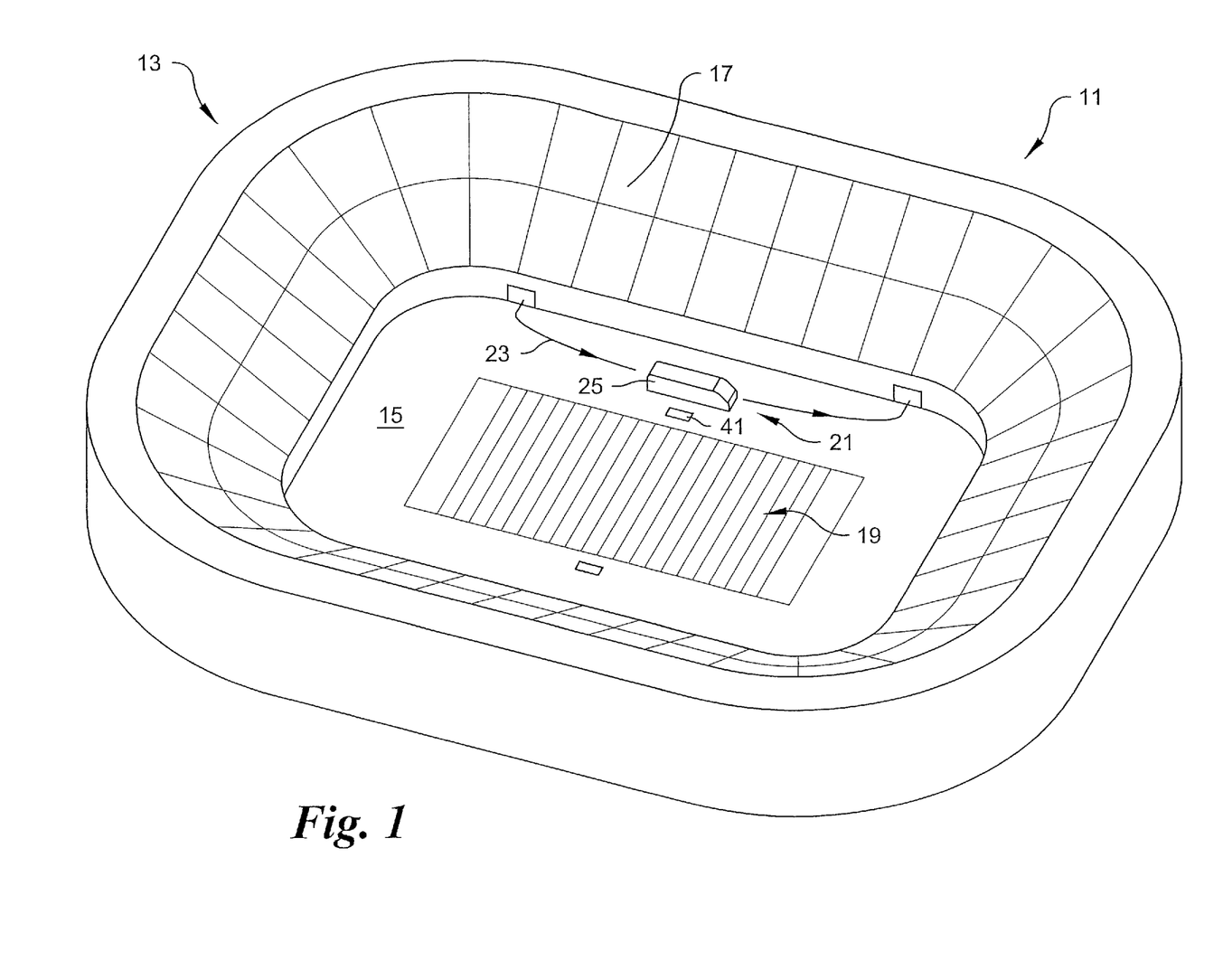
FIG. 1 is a view in perspective of a preferred inventive system 11, constructed in accordance with the invention.

The system 11 has a stadium 13 that includes a sports field 15 and a stadium seating area 17 surrounding the sports field 15. The sports field 15 comprises a playing area 19 on which the sporting event is played and a sideline area 21 situated between the playing area 19 and the stadium seating area 17.

The system 11 also includes a pathway 23 that extends along at least a portion of the sideline area 21, and a vehicle 25, which is adapted to move along the pathway 23, and which is provided to transport a plurality of spectators (e.g., sports fans) situated in the vehicle 25 simultaneously along the pathway 23 while the sporting event is taking place.

Preferably, the vehicle 25 is adapted to provide a view from the vehicle 25 of the sideline area 21, the playing area 19, and players and coaches on the sideline area 21, as well as players on the playing area 19, when the vehicle 25 is situated on the pathway 23 in the sideline area 21, thereby placing spectators (e.g., sports fans) riding in the vehicle 25 along the pathway 23 in the sideline area 21 amongst the players and the coaches in the sideline area 21 and closer to the players in the sideline area 21 and closer to the on-field action on the playing area 19 than the spectators sitting in the stadium seating area (e.g., the grandstands) 17 are, to enhance sports fan experience of the spectators riding in the vehicle 25. Preferably, providing such a view may be accomplished by providing the vehicle 25 with means for viewing the sideline area 21 and the playing area 19 while the vehicle 25 moves along the pathway 23 in the sideline area 21. In a preferred embodiment shown in FIG. 2, the viewing means comprises a clear, see-through side wall 27 of vehicle 25 that faces the playing area 19 as the vehicle 25 moves along the pathway 23 in the sideline area 21. The side wall 27 preferably comprises, in whole or substantial part, a clear, see-through glass (e.g., shatterproof or shatter-resistant glass) or a clear, see-through polymeric material (e.g., plexiglass, acrylic sheeting material, and the like). Optionally, but preferably, all of the remaining walls 29 and the roof 31 of the vehicle 25 also comprise, in whole or substantial part, a clear, see-through glass (e.g., shatterproof or shatter-resistant glass) or a clear, see-through polymeric material (e.g., plexiglass, acrylic sheeting material, and the like) to permit viewing of the sideline area 21, the playing area 19, and the stadium seating area 17 from the vehicle 25.

Figure 2:
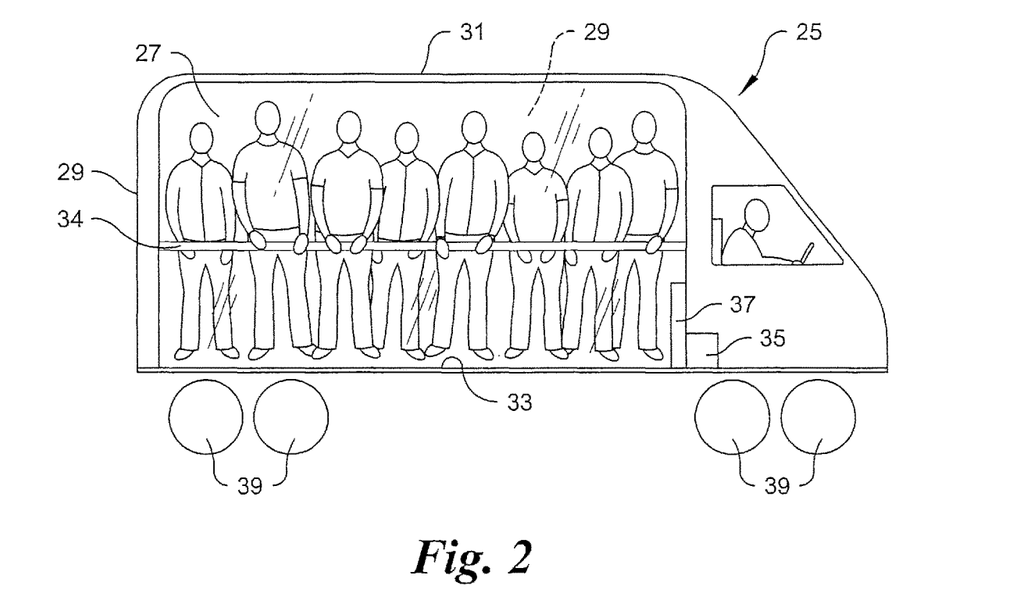
FIG. 2 is a schematic representation in side elevation of a preferred embodiment of a vehicle 25 used in the inventive systems.

In a preferred embodiment shown in FIG. 2, the interior of the vehicle 25 is encapsulated in soundproof or substantially soundproof plexiglass (that is, the side wall 27, the remaining walls 29, and the roof 31 of the vehicle 25 are comprised of plexiglass panels), which permits full visibility from the vehicle 25 through the side wall 27, the remaining walls 29, and the roof 31 of the vehicle 25, but prevents the spectators traveling in the vehicle 25 from speaking to or attempting to touch anyone or anything outside the vehicle 25 in the sideline area 21, so as to not interfere with the players or their equipment.

Preferably, vehicle 25 is provided with a vehicle floor 33 upon which spectators riding in the vehicle 25 may stand as the vehicle 25 moves along the pathway 23 in the sideline area 21. As shown in FIG. 2, the vehicle 25 in one preferred embodiment of the invention has no seats for the spectators riding in the vehicle 25 to sit in. In the embodiment of the invention in which vehicle 25 has no seats for the spectators riding in the vehicle 25 to sit in, a handrail 34 mounted to the vehicle 25 preferably is provided onto which the spectators may grasp so as not to lose their balance as the vehicle 25 moves along pathway 23. Preferably, the number of spectators riding in vehicle 25 at one time is limited so that each spectator has access to an unobstructed view from the vehicle 25 of the sideline area 21, the playing area 19, and players and coaches on the sideline area 21, as well as players on the playing area 19, when the vehicle 25 is situated on the pathway 23 in the sideline area 21, without pushing or shoving for a space in the vehicle 25 to obtain such a view. Preferably, the vehicle 25 is configured to transport 8 to 10 spectators at a time along the pathway 23 in the sideline area 21.

Preferably, the vehicle 25 is provided with at least one microphone 35 positioned outside the vehicle 25 to pick-up sounds of the sideline area 21, and a sound system 37 positioned in the vehicle 25 that is adapted to transmit into the interior of the vehicle 25 sounds picked-up by the at least one microphone 35.

Preferably, the vehicle 25 is an electric or gas-powered motorized vehicle (like a bus or a car or a tram or a tram car), having wheels 39 and a drive train for turning at least some of the wheels 39, brakes for slowing and stopping the vehicle 25, and a steering mechanism, that is driven by a driver positioned in the vehicle 25. Alternatively, the vehicle 25 may be remotely controlled by personnel not located in the vehicle 25 or controlled by a computer program, such as by technology such as that disclosed in Fairfield U.S. Patent Application Publication No. U.S. 2016/0370801A1 or Gecchelin U.S. Patent Application Publication No. U.S. 2018/0022405 A1, both of which are incorporated herein by reference.

Figure 3:
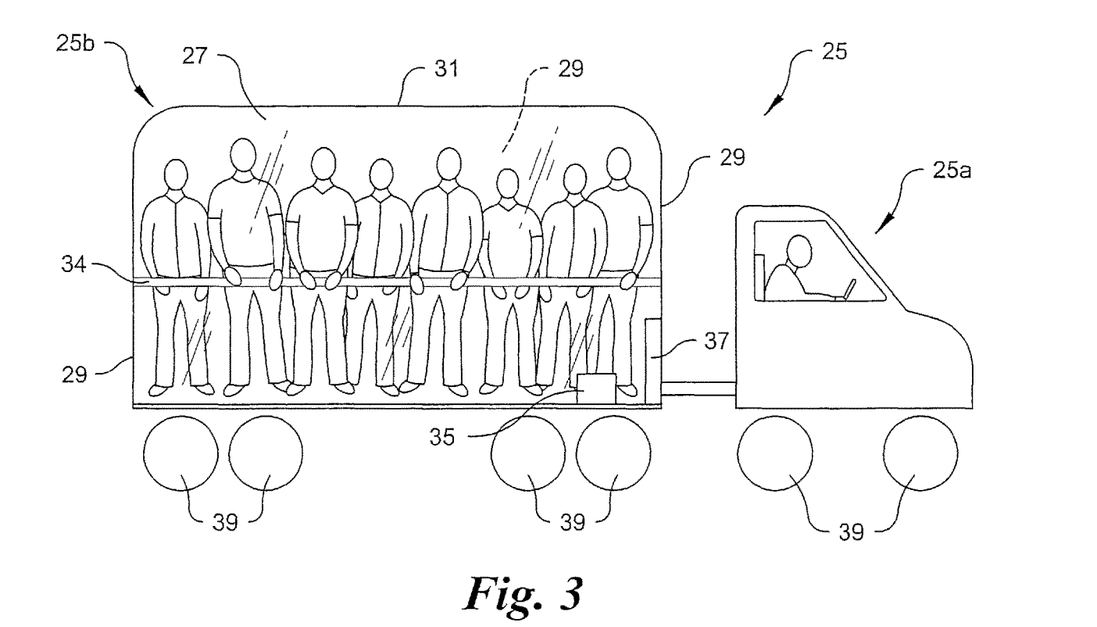
FIG. 3 is a schematic representation in side elevation of an alternative embodiment of a vehicle used in the inventive systems.

Alternatively, as shown in FIG. 3, the vehicle 25 may be configured like a tram car and may comprise a combination of a motor-less carriage 25b in which the spectators are carried, and an electric or gas-powered towing vehicle 25a for towing the carriage 25b along the pathway 23. The vehicle 25 shown in FIG. 3 may be driven by a driver positioned in towing vehicle 25a, or, using technology such as that disclosed in Fairfield U.S. Patent Application Publication No. U.S. 2016/0370801A1 or Gecchelin U.S. Patent Application Publication No. U.S. 2018/0022405 A1, both of which are incorporated herein by reference, may be remotely controlled by personnel not located in towing vehicle 25a or controlled by a computer program or controlled with a driverless vehicle technology guidance system.

The pathway 23 preferably is a designated route along which the vehicle 25 travels at least in part along the sideline area 21, and the pathway 23 preferably extends along the sideline area 21 behind the player bench in the bench area 41. The pathway 23 may be configured to fit existing stadiums so as to meet any spacing limitations existing stadiums may have, and the pathway 23 may be configured to meet any spacing limitations of new stadiums being built. FIGS. 1, 4-9, and 19 illustrate a variety of preferred pathways 23. Preferably, the pathway 23 has a continuous loop configuration, and the pathway 23 extends substantially along the entire length of the playing area 19. Also, the pathway 23 preferably has at least a portion that extends along the sideline area 21 between the stadium seating area 17 and a bench area 41 positioned in the sideline area 21. Preferably, the pathway 23 is wide enough to contain the width of the vehicle 25. In a preferred embodiment, the width of the pathway is about 8 to 12 feet and preferably is 10 ft.

Figure 4:
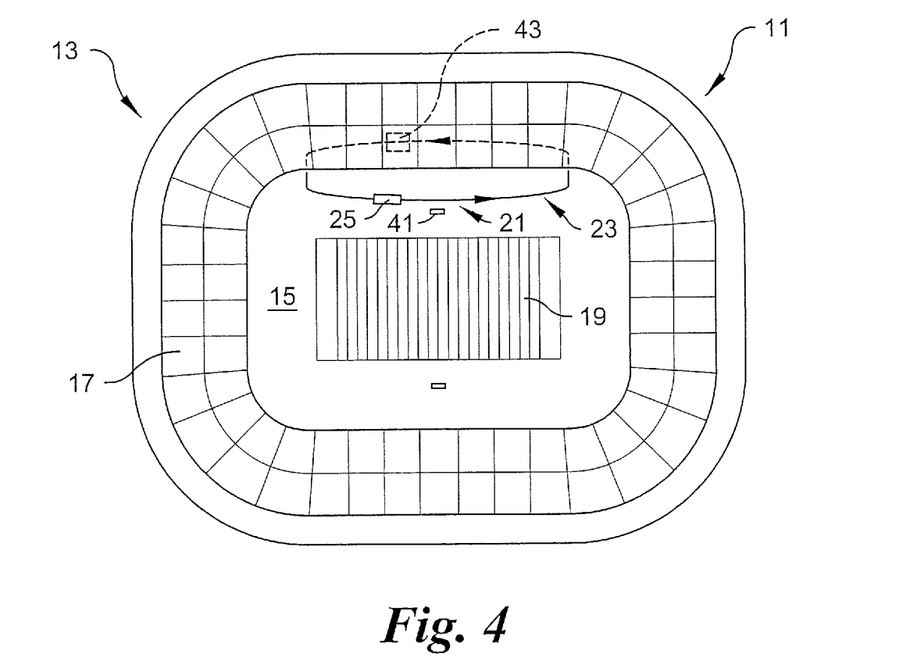
FIGS. 4-9 and 19 are schematic representations showing top plan views of a stadium in which a variety of preferred pathways 23 used in the various embodiments of the inventive systems are illustrated.
Figure 5:
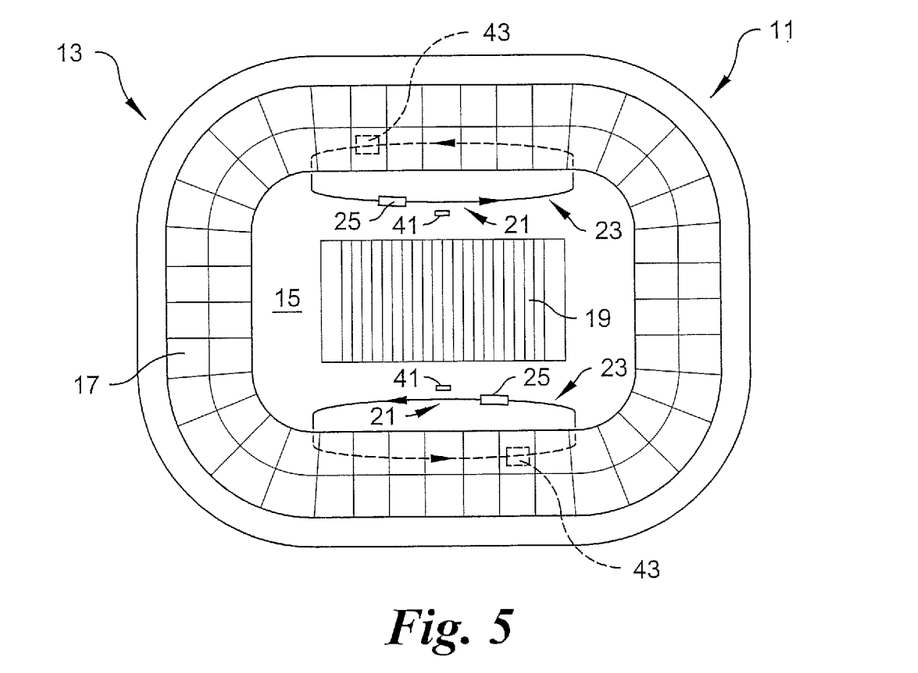
Figure 6:
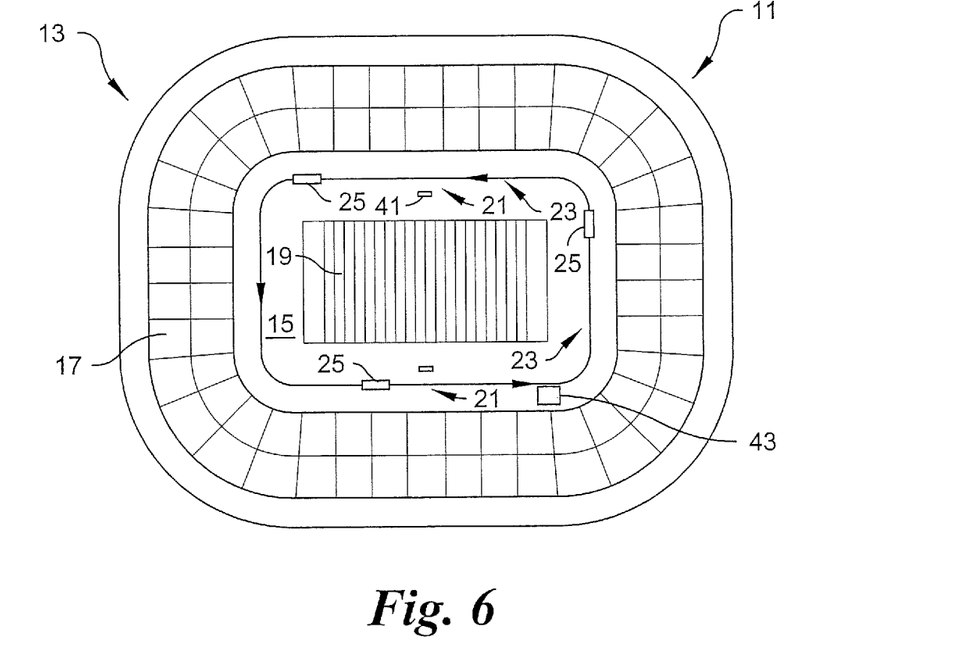
Figure 7:
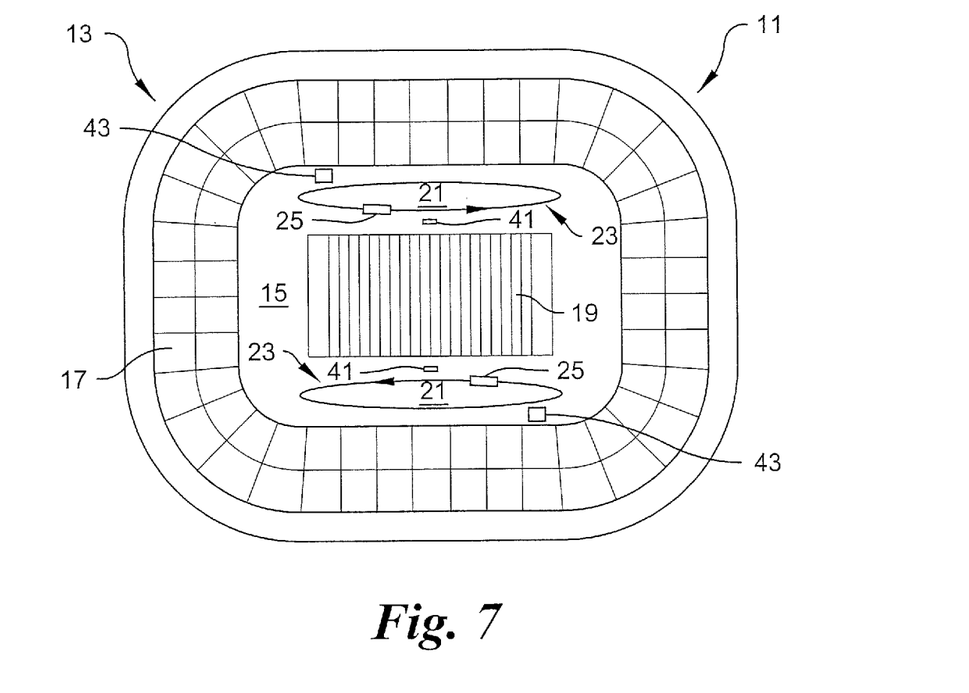
Figure 8:
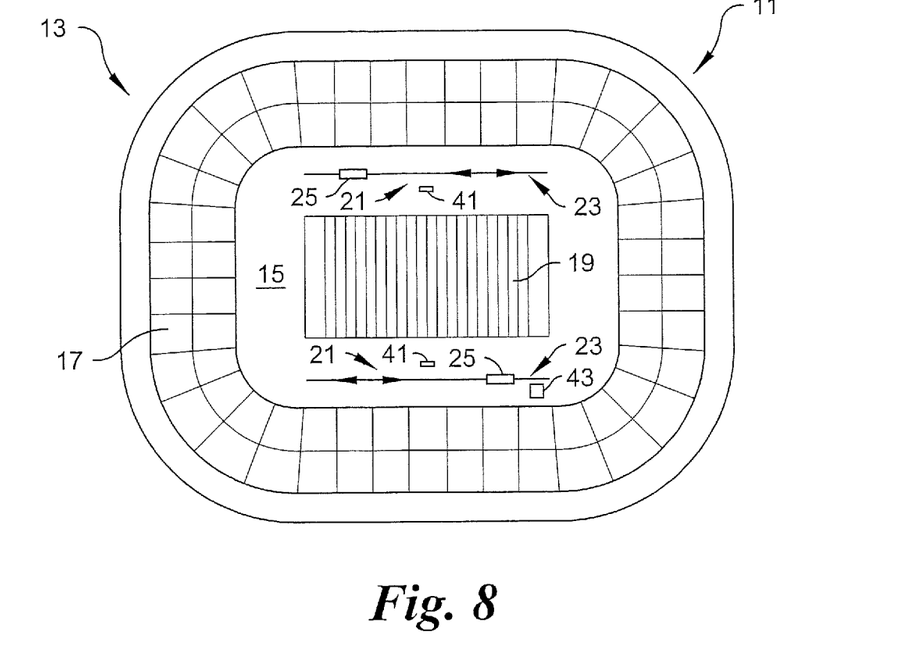
Figure 9:
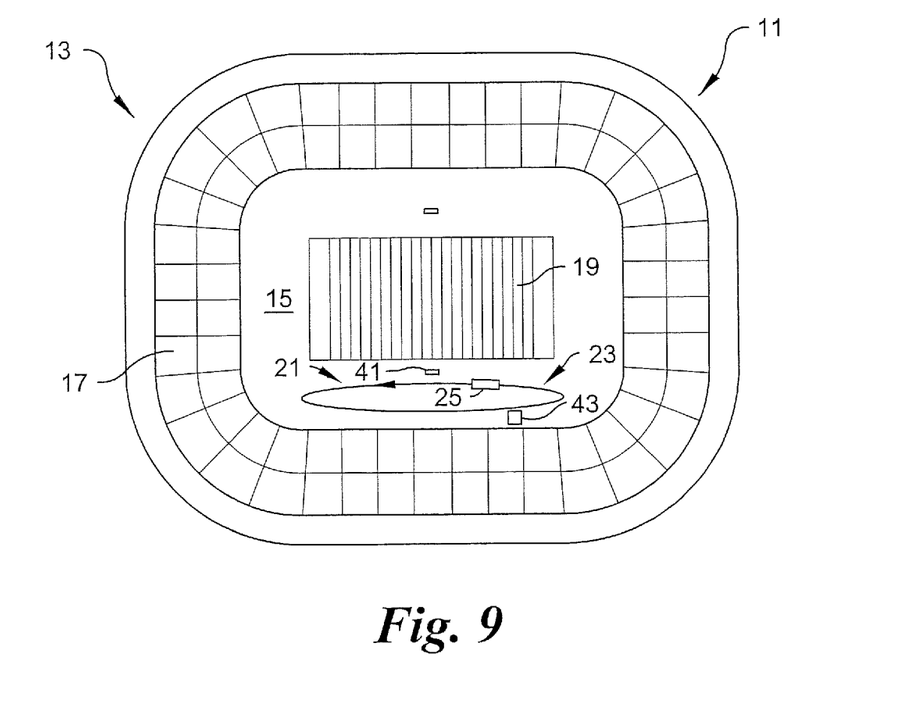

In one preferred embodiment, the pathway 23, as shown in FIGS. 1, 4, and 5, extends from beneath the stadium seating area 17 to the sideline area 21, and then preferably along the sideline area 21 along substantially the entire length of the playing area 19, with a portion of the pathway 23 preferably extending along the sideline area 21 between the stadium seating area 17 and the bench area 41, and then back beneath the stadium seating area 17, the pathway 23 preferably having a continuous loop configuration. In this preferred embodiment, the spectators may board and later disembark the vehicle 25 at a station 43 located beneath the stadium seating area 17.

Optionally, the system 11 may be provided with an electromagnetic guidance system for guiding the vehicle 25 along the pathway 23 (that is, for keeping the vehicle 25 on the designated path of the pathway 23). For example, as taught in Salter et al. U.S. Pat. No. 5,629,595, which is incorporated herein by reference, the vehicle 25 may be provided with position sensors located on the vehicle 25, and a vehicle position controller operatively coupled to the position sensors and to a steering controller for confining lateral movement of the vehicle 25 to within set boundaries, and an electrical conductor, such as a wire, may be buried along the centerline of the pathway 23. An alternating current (AC) source may be provided to inject an electrical signal of predetermined frequency along the buried wire so as to create a magnetic field about the wire. The magnetic field is sensed by the vehicle position sensors and utilized by the vehicle position controller to confine the lateral movement of the vehicle to a predetermined envelope that follows the pathway 23.

Alternatively, the vehicle 25 of the system 11 may be provided with a guidance system which includes a navigation/pathing system, an obstacle avoidance system, a computer vision system, a Global Positioning System, lasers or other optical sensors, and/or radar, such as that disclosed in Fairfield U.S. Patent Application Publication No. U.S. 2016/0370801 A1, which is incorporated herein by reference, for guiding the vehicle 25 along the pathway 23.

The vehicle 25 of the system 11 also may be provided with sensors, such as those disclosed in Hoddle U.S. Pat. No. 10,065,129, which is incorporated herein by reference, to avoid hitting objects in the pathway 23.

Preferably, the vehicle floor 33 is about 2 feet above ground level (that is, about 2 feet above the level of the sideline area 21) to raise the eye level of the spectators riding in the vehicle 25 by about 2 feet, so that the views of the spectators riding in the vehicle 25 are less likely to be obstructed by players and personnel situated in the sideline area 21 (since the spectators standing on the vehicle floor 33 are likely to be able to see over the players and personnel situated in the sideline area 21). Preferably, the height of the vehicle floor 33 should be limited such that the height of the roof 31 of the vehicles 25 does not exceed higher than 10 feet above the level of the sideline area 21 so as not to obstruct the sightline of spectators sitting in the lowest seats in the stadium seating area 17.

Figure 10:
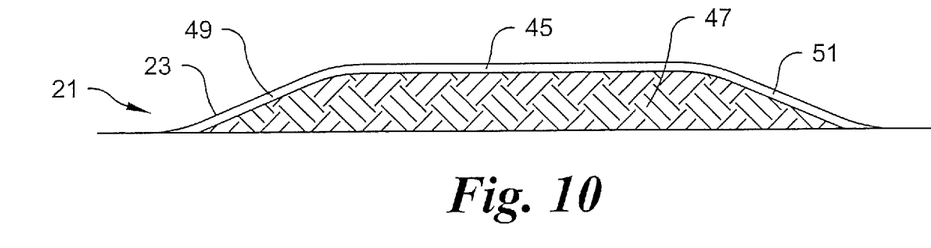
FIG. 10 is a view in cross section illustrating an elevated portion 45 of the pathway 23.

Preferably, as shown in FIG. 10, the pathway 23 has an elevated portion 45 (that is, a portion of the pathway 23 that is elevated above ground level of the surrounding sideline area 21), such as that created by a raised platform or mound 47 having an entrance ramp 49 that extends from the pathway 23 at ground level in the sideline area 21 to the top of the platform or mound 47 and an exit ramp 51 that extends from the top of the platform or mound 47 back to the pathway 23 at ground level in the sideline area 21. As the vehicle 25 proceeds along the pathway 23 in the sideline area 21, it may proceed up the entrance ramp 49 to the raised platform or mound 47 to raise the height of the vehicle 25 upwardly above the ground level of the surrounding sideline area 21, so that the views from the vehicle 25 of the playing area 19 are not obstructed by players and personnel in the sideline area 21. When it is desired to continue to proceed further along the pathway 23, the vehicle may proceed along the pathway 23 by being driven down the exit ramp 51 from the raised platform or mound 47 and continue to move along the pathway 23. A preferred location for the raised platform or mound 47 is located behind the bench area 41 between the bench area 41 and the stadium seating area 17. Preferably, the portion 45 is elevated above the ground level of the surrounding sideline area 21 by about 1 foot to about 3 feet.

Figure 11:
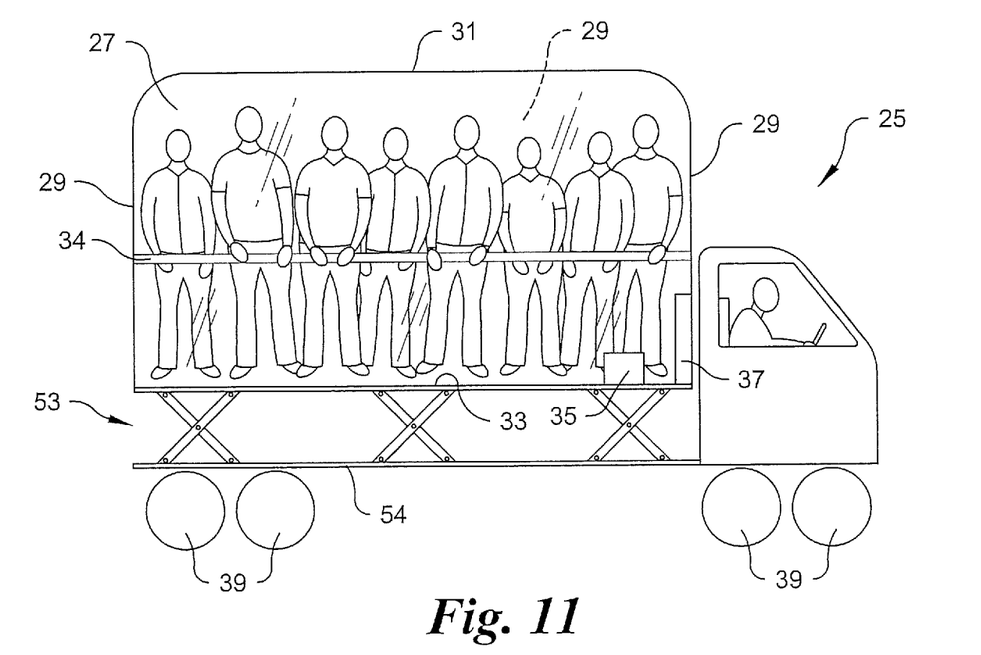
FIG. 11 is a schematic representation in side elevation of one embodiment of the vehicle 25 used in the inventive systems.

Referring to FIG. 11, the vehicle 25 also may be provided with a lift system 53 mounted on the frame 54 of the vehicle 25 and connected to the vehicle floor 33 of the vehicle 25 (such as the hydraulic lift system disclosed in Ochi U.S. Pat. No. 6,341,564 or the scissor lift disclosed in Hammonds U.S. Pat. No. 7,690,473 or the hydraulic lift system disclosed in Baxter U.S. Pat. No. 5,623,878 or the lift system disclosed in Gary U.S. Pat. No. 5,105,915, all of which are incorporated herein by reference), which elevates that vehicle floor 33 upwardly, preferably up to 3 feet, to lessen the likelihood that the views of the spectators riding in the vehicle 25 are obstructed by players and personnel situated in the sideline area 21, since the spectators standing on the raised vehicle floor 33 are likely to be able to see over the players and personnel situated in the sideline area 21.

Figure 12:
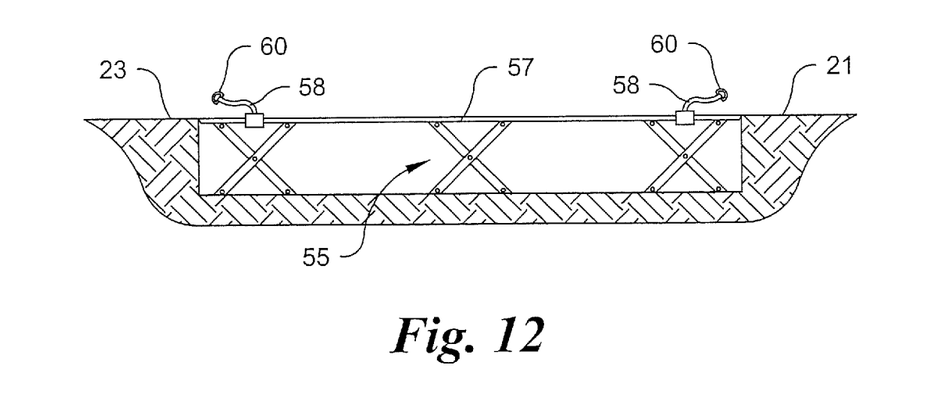
FIG. 12 is a schematic representation of a lift system 55 positioned in the sideline area 21 along the pathway 23 for raising a vehicle of the inventive systems upwardly to provide spectators riding in the vehicle sightlines above the heads of players and personnel situated in the sideline area 21.

The pathway 23, as shown in FIG. 12, also may be provided with a lift system 55 (such as a lift system using technology such as that disclosed in Ochi U.S. Pat. No. 6,341,564 or Hammonds U.S. Pat. No. 7,690,473 or Baxter U.S. Pat. No. 5,623,878 or Gary U.S. Pat. No. 5,105,915, all of which are incorporated herein by reference) preferably positioned in the sideline area 21 along the pathway 23. Specifically, the pathway 23 may have a portion that has a platform or panel 57 that is connected to and may be raised and lowered by the lift system 55. The platform 57 initially is positioned at ground level of the sideline area 21, and is strong enough to support the vehicle 25 and the spectators therein. When the vehicle 25 is secured to the platform 57 (using, for example, a plurality of tire straps 58/D-rings 60 combinations connected to the platform 57 to tie the tires 39 to the platform 57), the platform 57 may be raised upwardly by the lift system 55 to raise the vehicle 25 positioned on the platform 57 and the spectators riding in the vehicle 25 upwardly to preferably raise the sightline of the spectators riding in the vehicle 25 above the height of the players and personnel in the sideline area 21 so that views from the vehicle 25 of the playing field 19 are not obstructed by the players and personnel in the sideline area 21, and may be later lowered to the ground level of the sideline area 21 when desired so that the vehicle 25 may be released from the platform 57 to continue its journey along the pathway 23. Preferably, the platform or panel 57 may be elevated above the ground level of the surrounding sideline area 21 by about 1 foot to about 3 feet.

Use of the system 11 provides a method for enhancing sports fan experience when attending sporting events. In use, spectators (e.g., sports fans) board or are loaded into the vehicle 25 of the provided system 11, preferably at a station area 43, which may be located at any convenient location along the pathway 23. Then, the spectators are transported via vehicle 25 along the pathway 23 in the sideline area 21 while a sporting event is taking place, thereby placing the spectators riding in the vehicle 25 amongst and/or in close proximity to the players and personnel in the sideline area 21 and in close proximity to the on-field action where the spectators riding in the vehicle 25 may see up-close what occurs along the sideline area 21 and on the playing area 19 and hear what is being said by players and personnel along the sideline area 21 and on the playing area 19, to enhance their fan experience. When desired, the spectators are transported by the vehicle 25 to an exit location, preferably at a station 43, where their journey ends, to disembark or be unloaded from the vehicle 25. The time length for a trip along pathway 23 in a vehicle 25 from boarding the vehicle 25 until disembarking from the vehicle 25 may be determined by the stadium owner or stadium operator, as desired.

Preferably, during the journey along the pathway 23, the vehicle 25 stops at designated locations, such as behind the bench area 41, or on the elevated portion 45 of the pathway 23 if the elevated portion 45 is provided, and/or anywhere in the sideline area 21 next to where play is occurring on the playing area 19 to get a close-up view of the action on the playing field 19.

During the journey along the pathway 23, the views of the spectators riding in the vehicle 25 also may be raised upwardly, if desired, by elevating the vehicle floor 33 via the lift system 53 if the lift system 53 is provided in vehicle 25, or via elevating the vehicle 25 after is has been secured to the platform 57 with the lift system 55 that upwardly lifts the platform 57 positioned along the pathway 23, if the platform 57 and lift system 55 are provided to the system 11.

Figures 13, 14:
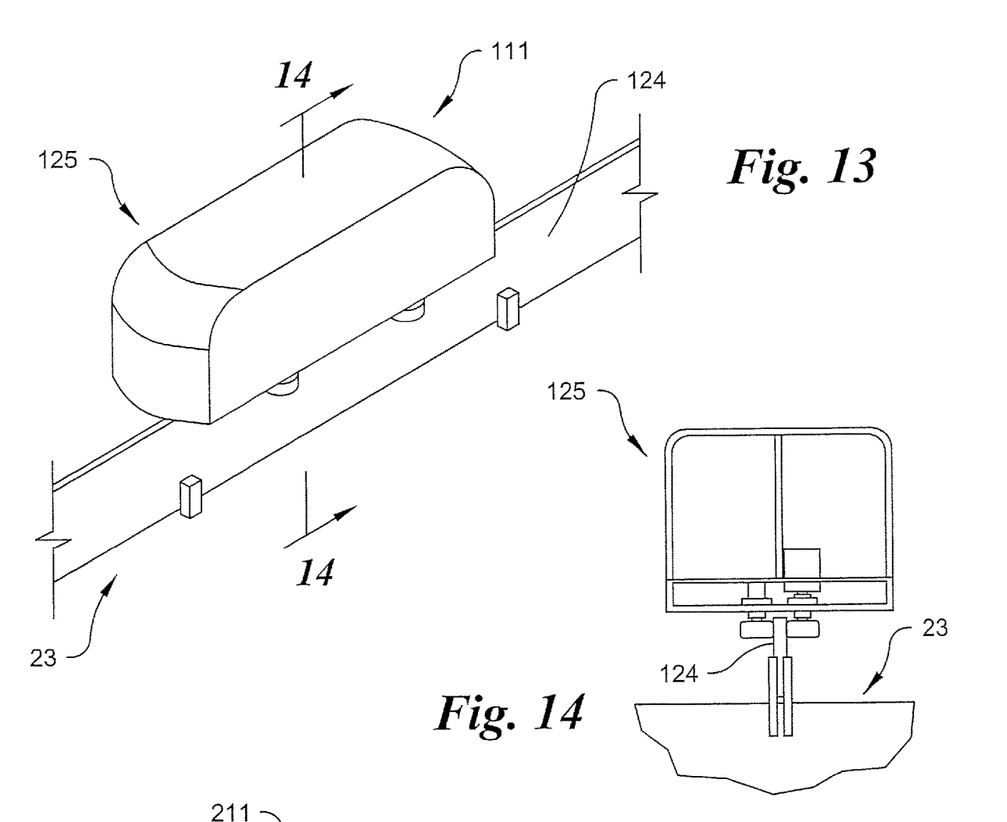
FIG. 13 is a view in perspective of a preferred embodiment of a vehicle 125 used in the inventive systems that rides upon a rail assembly 124.
FIG. 14 is a view taken along the lines and arrows 14-14 shown in FIG. 13

FIGS. 13-14 shows an alternative embodiment of the invention. In this alternative embodiment, system 111 is substantially the same as system 11, except that instead of the car-like or bus-like vehicle 25 that rides on the surface of the sideline area 21, a vehicle 125 is provided in combination with a rail assembly 124. The vehicle 125 of this alternative embodiment is substantially the same as vehicle 25, except vehicle 125 rides on the rail assembly 124 in a manner, for example, disclosed in Dore U.S. Pat. No. 6,715,425, which is incorporated herein by reference, instead of on wheels 39. In this alternative embodiment, the rail assembly 124 is positioned along the pathway 23, and the vehicle 125 carries the spectators riding therein on the rail assembly 124 along the pathway 23. The system 111 is used in the same way as system 11 to enhance sports fan experience when attending sporting events.

Figure 15:
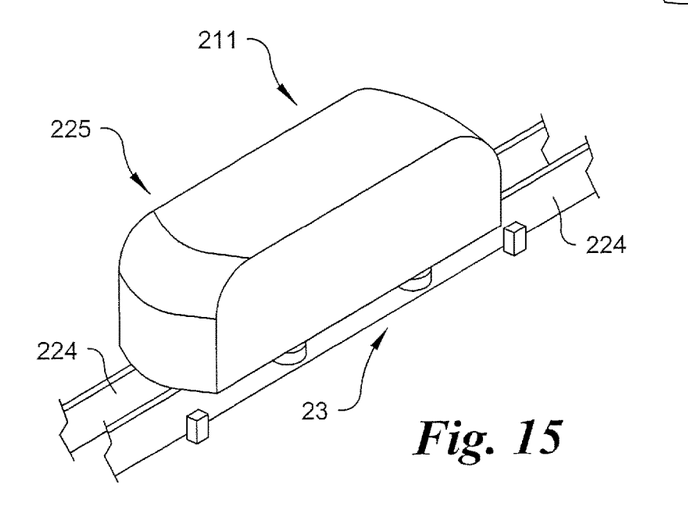
FIG. 15 is a view in perspective of an alternative embodiment of a vehicle (vehicle 225) used in the inventive systems that rides upon a rail assembly 224.

Alternatively, referring to FIG. 15, instead of the system 111 that has the rail assembly 124 and vehicle 125, a system 211 may be provided to enhance sports fan experience when attending sporting events. System 211 is substantially the same as and substantially used the same as system 111, except a rail assembly 224, which is a traditional double-rail assembly used by railroad trains and many amusement park rides, is provided in place of the single rail assembly 124 of system 111, and a vehicle 225, which is substantially identical to the vehicle 125, except that vehicle 225 is adapted to ride on the double-rail assembly 224 as is known from the railroad train and amusement park arts, is provided in place of the vehicle 125. In this embodiment, the double-rail assembly is positioned along the pathway 23.

Figure 16:
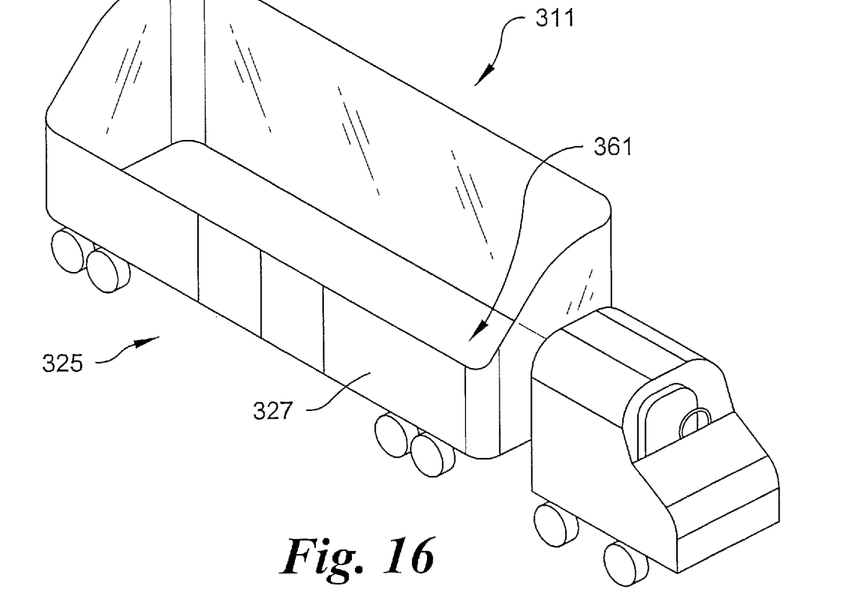
FIG. 16 is a view in perspective of an open-air vehicle 325 used in the inventive systems.

Another embodiment of the invention is shown in FIG. 16. In this alternative embodiment, my invention comprises system 311, which is substantially the same as system 11, 111, and 211 described above, except, instead of a vehicle 25, 125, or 225, a vehicle 325 is provided. Vehicle 325 is substantially the same as any of the vehicles 25, 125, or 225, except that vehicle 325 has at least an open side portion 361 that has either no barrier wall or only a partial barrier wall 327. That is, system 311 may match any of the systems 11, 111, or 211, with the exception that the system 311 has a vehicle 325 that may be substantially the same as any of the vehicles 25, 125, or 225 but with at least one open side portion 361 that has either no barrier wall or only a partial barrier wall 327 between the interior of the vehicle 325 of the system 311 and the exterior of the vehicle 325 of the system 311.

Figure 17:
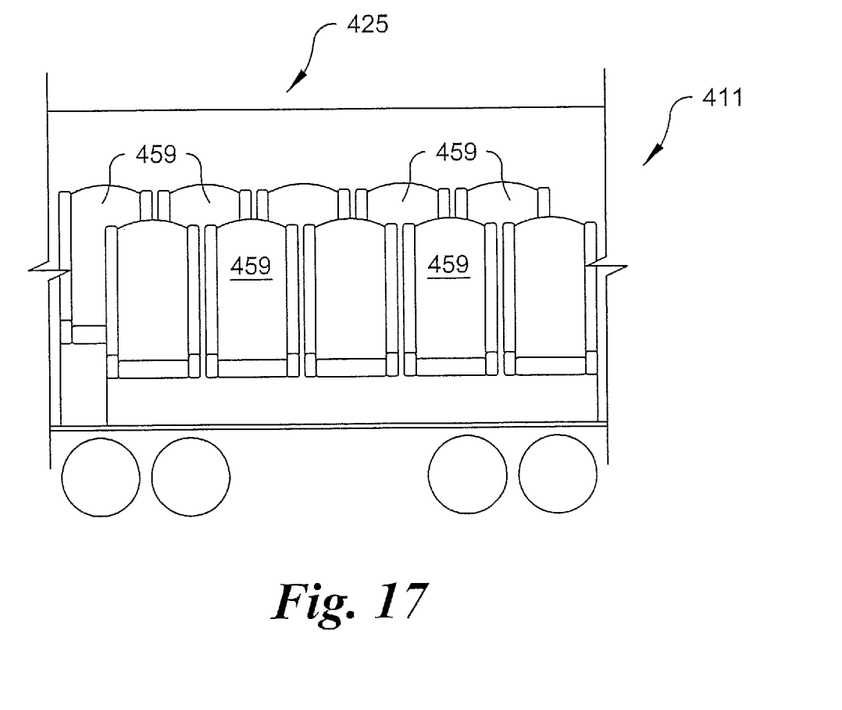
FIG. 17 is a partial view in side elevation of various vehicles used in the inventive systems, in which the vehicles are provided with seats 459.

Still another alternative embodiment of the invention is shown in FIG. 17. In this alternative embodiment, my invention comprises a system 411, which is substantially the same as system 11, 111, 211, and 311 described above, except that instead of vehicles 25, 125, 225, and 325, a vehicle 425 is provided that has vehicle seats 459. That is, the vehicle 425 is identical to any of the vehicles 25, 125, 225, and 325, except that the vehicle 425 is provided with seats 459. Preferably, the vehicle seats 459 are mounted to the interior of vehicle 425 of system 411, preferably oriented in two rows of 4 or 5 seats (5 seats 459 being shown in FIG. 17), with the front row being lower than the rear row in order that the spectators seated in the rear row may see over the heads of those in the front row. To be clear, system 411 may match any of systems 11, 111, 211, or 311, with exception that the vehicle 425 of system 411 has vehicle seats 459.

The systems 11, 111, 211, 311 and 411 may use more than one vehicle, and, if more than one vehicle is used, the vehicles may be linked together serially like a train, if desired.

Figure 20:
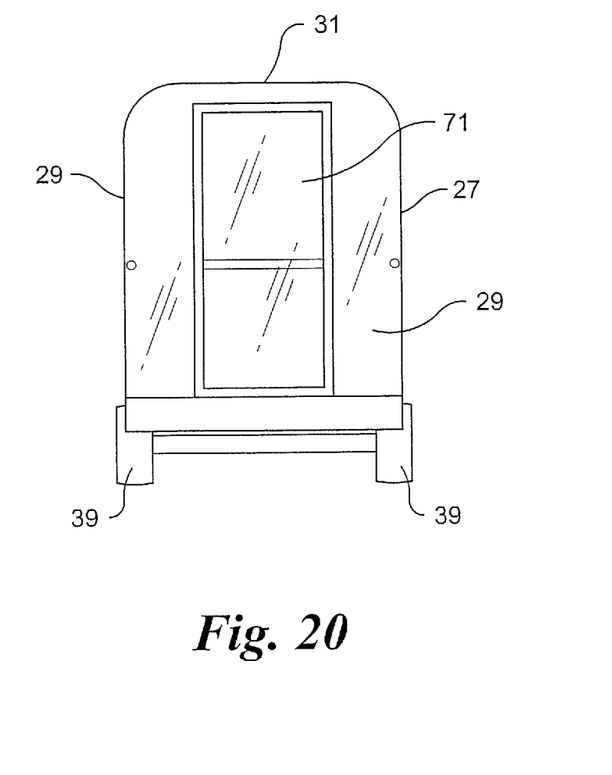
FIG. 20 is a view in rear elevation of various vehicles used in the inventive systems, in which a door 71 through which to enter and exit the vehicle is shown.

Preferably, each vehicle 25, 125, 225, and 425 is provided with a door 71 in its rear wall 29 through which passengers (e.g., fans) may enter and exit the vehicles, and, preferably, the door 71 to each vehicle 25, 125, 225, 425 may be locked from the outside of the vehicle 25, 125, 225, 425 to lock the spectators inside the vehicle 25, 125, 225 and 425 while the vehicle 25, 125, 225, 425 journeys along the pathway 23, preventing the spectators riding in the vehicle 25, 125, 225, 425 from disembarking from the vehicle 25, 125, 225, 425 while in the bench area 41 or near the playing area 19 and thereby avoiding possible injury by being run into by a player, and preventing the spectators riding in the vehicle 25, 125, 225, 425 from disembarking the vehicle 25, 125, 225, 425 while in the bench area 41 or near the playing area 19 and refusing to leave the sideline area 21 and/or interfering with players and personnel in the sideline area 21. Preferably, after the spectators have boarded the vehicle 25, 125, 225, 425 at the station 43, someone that is part of stadium personnel located at the station area 43 locks the door 71 of the vehicle 25, 125, 225, 425 and the door 71 remains locked until someone that is part of stadium personnel located at the stadium area 43 unlocks the door 71 when the vehicle 25, 125, 225, 425 returns to the station area 43. In case of an emergency, the door 71 of vehicle 25, 125, 225, 425 may be unlocked at any time by someone that is part of security personnel who preferably walks along with the vehicle 25, 125, 225, 425 as it traverses the pathway 23.

Figure 18:
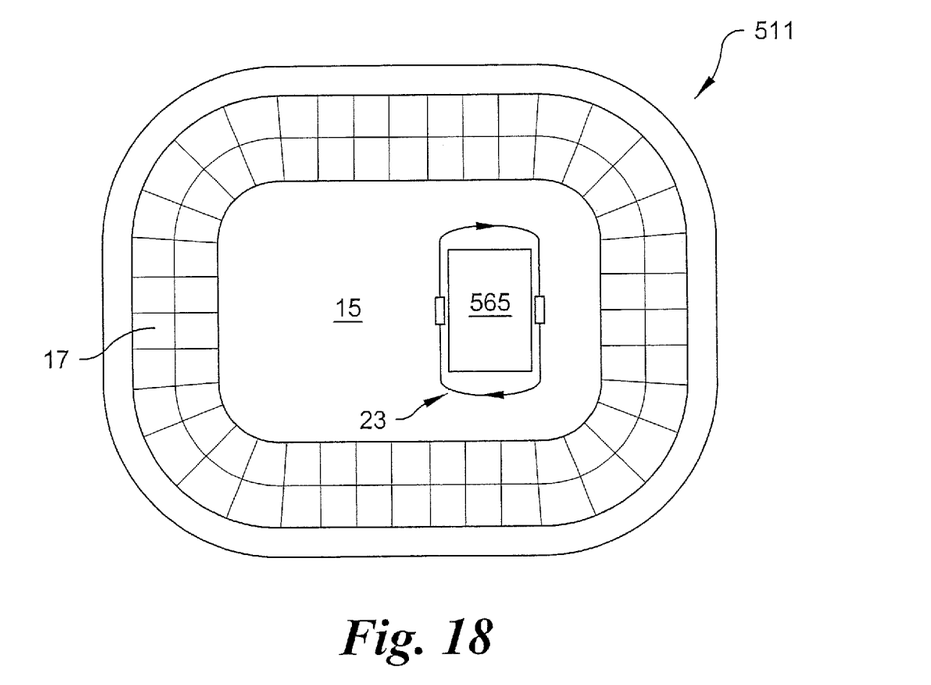
FIG. 18 is a schematic representation of another preferred embodiment of the invention, in which a stadium is shown in a top plan view and a preferred pathway 23 is illustrated for the inventive system 511.
Figure 19:
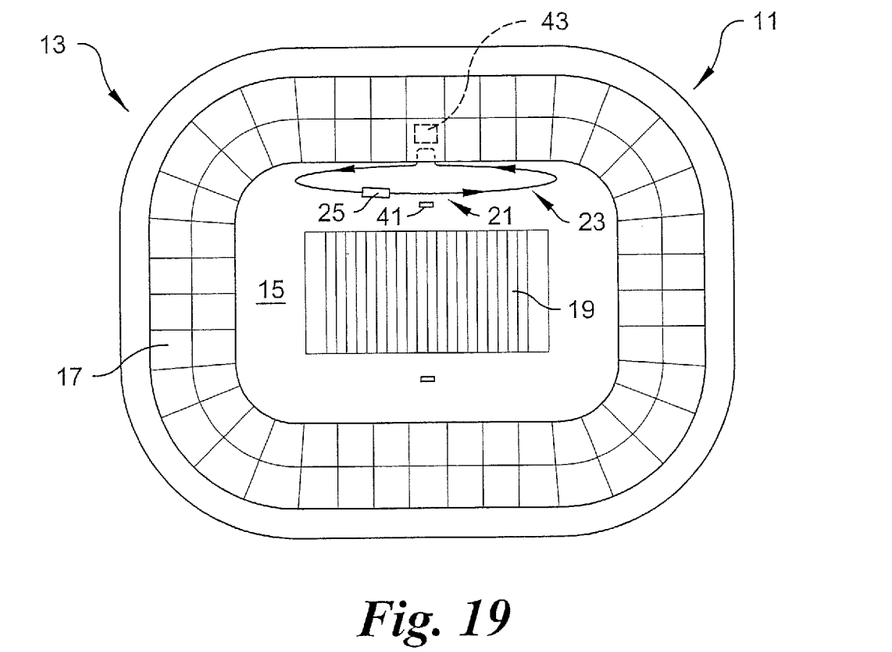

Turning now to FIG. 18, there is shown another embodiment of my invention. Here, there is shown my inventive system 511 for enhancing fan experience when attending an entertainment event, such as a musical concert. System 511 is substantially the same as any of the system 11, 111, 211, 311, and 411, except that a stage 565 is provided on a portion of the sports field 15, and the pathway 23 extends along at least a portion of the sports field 15 adjacent to and in close proximity to the stage 565. That is, system 511 may match any of system 11, 111, 211, 311, and 411, with the exceptions that the system 511 includes a stage 565 on a portion of the playing field 15, and the pathway 23 extends along at least a portion of the sports field 15 adjacent to and in close proximity to the stage 565. The vehicle 25, 125, 225, 325, or 425 of system 511 is adapted to transport fans situated in the vehicle 25, 125, 225, 325, or 425 of system 511 along the pathway 23 while the entertainment event is taking place, providing a view of performers performing on the stage 565 when the vehicle 25, 125, 225, 325, or 425 of system 511 is situated on the pathway 23 adjacent to the stage 565, thereby placing the fans riding in the vehicle 25, 125, 225, 325, or 425 of system 511 adjacent to the stage 565 and closer to the performers performing on the stage 565 than fans sitting in the stadium seating area 17 are, to enhance the fan experience of the fans riding in the vehicle 25, 125, 225, 325, or 425 of system 511 where the fans riding in vehicle 25, 125 225, 325, or 425 of system 511 may see and hear up-close what occurs on the stage 565.

In use, the system 511 is used substantially the same as system 11, 211, 311, and 411, except that since the pathway 23 of system 511 is situated on a portion of the sports field 15 adjacent to the stage 565, the fans riding in the vehicle 25, 125, 225, 325, or 425 of system 511 are transported preferably immediately adjacent to the stage 565 and closer to the performers performing on the stage 565 than fans sitting in the stadium seating area 17 are, thereby enhancing fan experience of the fans riding in the vehicle 25, 125, 225, 325, or 425 of system 511 by placing them in a prime location to watch and listen to the performers performing in the stage 565. Preferably, the pathway 23 of system 511 extends along the sports field 15 to immediately adjacent the stage 565 such that the fans riding in the vehicle 25, 125, 225, 325, or 425 of system 511 are positioned at some point during their ride immediately behind the stage 565 to obtain a view equivalent to that obtained by a backstage pass, and/or are positioned at some other point during their ride immediately in front of the stage 565 to obtain a view equivalent to that obtained by having front row seats. During the journey along pathway 23 of system 511, the vehicle 25, 125, 225, 325, or 425 of system 511 may stop at designated locations, such as immediately in front of and adjacent to the stage 565 (preferably, within 3 inches from the stage 565) and/or immediately behind and adjacent to the stage 565 (preferably, within 3 inches from the stage 565). When vehicle 325 (or the version of vehicle 425 that comprises vehicle 325 with seats 459) is used in system 511, the spectators riding in the vehicle 325 (or the version of vehicle 425 that comprises vehicle 325 with seats 459) experience the performance on the stage 565 without looking through glass or clear polymeric material since the vehicle 325 and the version of vehicle 425 that comprises vehicle 325 with seats 459 are open-air vehicles (that is, vehicle 325 and the version of vehicle 425 that comprises vehicle 325 with seats 459 have at least an open side portion 361 that has either no barrier wall or only a partial barrier wall 327), thereby enabling the fans riding in the vehicle 325 (or the version of vehicle 425 that comprises vehicle 325 with seats 459) to have a view of the stage 565 and the performance that is not hindered by looking through glass or clear polymeric material. Also, preferably, when a partial barrier wall 327 is provided, vehicle 325 and the version of vehicle 425 that comprises vehicle 325 with seats 459 are provided with a door 363 in the partial barrier wall 327 through which the fans riding in the vehicle 325 or the version of vehicle 425 that comprises vehicle 325 with seats 459 may disembark from the vehicle and step onto the stage 565 when the vehicle stops immediately behind and adjacent to the stage 565 to enhance the fan experience by providing a backstage experience at a musical concert performed on the stage 565. The fans may be given an allotted amount of time to spend backstage before the fans re-board the vehicle and continue their journey along the pathway 23.

The length of the vehicles 25, 125, 225, 325, and 435 may be various lengths, depending primarily upon how many passengers (e.g., fans) are riding in the vehicles at one time. For an eight-passenger vehicle 25, 125, 225, 325, and 425, preferably, the length of the vehicle 25, 125, 225, 325, and 425 is 16 feet.

The width of the vehicles 25, 125, 225, 325, and 425 also may be various widths. For instance, the width of the vehicles 25, 125, 225 and 325 may be about 30 inches since the vehicles do not have seats. A width of about 30 inches minimizes the amount of space used by the vehicles on the sideline area 21, thereby limiting any potential interference with the players on the sideline area 21. Further, a width of about 30 inches minimizes movement of the passengers (e.g., fans) riding in the vehicles, but provides just enough room for the passengers (e.g., fans) to turn around to look out the opposite side of the vehicle when, for instance, the opposite side of the vehicle faces the playing area 19 during the ride along the pathway 23. In general though, preferably, the width of the vehicles 25, 125, 225, and 325 ranges between 30 inches and 8 feet, and may be anywhere therebetween. If it is desired to make it easier for the passengers (e.g., fans) riding in any of the vehicles 25, 125, 225, and 325 to move around freely inside the vehicle to position themselves in the vehicle where they desire to obtain a view of the sideline area 21, the playing area 19, and players and coaches on the sideline area 21, as well as players on the playing area 19, when the vehicle is situated on the pathway 23 in the sideline area 21, or if it is desired to accommodate passengers that are confined to wheelchairs, a width of about 6 feet to about 8 feet for the vehicles 25, 125, 225, and 325 is preferred.

Preferably, the width of the vehicles 425, which comprises any of the vehicles 25, 125, 225, and 325 but with seats 565, ranges between about 3 feet and 8 feet depending upon how many rows of seats 565 are provided and how much space is provided between rows of seats 565.

The invention claimed is:

1. A system, comprising
a stadium having a field area,
a stadium seating area at least substantially surrounding and being adjacent to the field area, the stadium seating area at least substantially surrounding and being adjacent to the field area being a distinct area from the field area,
the field area comprising a playing area on which a sporting event is played and a sideline area, the sideline area being situated on the field area between the playing area and the stadium seating area, the sideline area of the field area being a distinct area from the stadium seating area, a pathway having at least a portion extending on and along at least a portion of the field area, and a vehicle adapted to move along the pathway, the vehicle being adapted to transport a plurality of sports fans situated therein simultaneously on and along the portion of the pathway extending on and along at least a portion of the field area while the sporting event is taking place, and the vehicle having means for viewing the sideline area of the field area from the field area, the playing area of the field area from the field area, players and/or coaches on the sideline area of the field area from field area, and players on the playing area of the field area from the field area as the vehicle moves on and along the portion of the pathway extending on and along at least a portion of the field area, thereby placing the sports fans riding in the vehicle along the portion of the pathway extending on and along at least a portion of the field area closer to players, coaches, and on-field action than fans sitting in the stadium seating area.

2. The system of claim 1, the pathway defining a loop configuration around which the vehicle may move.

3. The system of claim 1, the portion of the pathway extending on and along at least a portion of the field area extending adjacent to the playing area substantially along an entire length of the playing area.

4. The system of claim 3, the pathway having a continuous loop configuration around which the vehicle may move.

5. The system of claim 3, the portion of the pathway extending on and along at least a portion of the field area having a portion extending on the field area between the stadium seating area and a bench area positioned in the sideline area of the field area.

6. The system of claim 1, the pathway extending from beneath the stadium seating area to the field area and then back to beneath the stadium seating area.

7. The system of claim 6, the portion of the pathway extending on and along at least a portion of the field area having a portion extending on the field area along the sideline area of the field area between the stadium seating area and a bench area positioned in the sideline area of the field area.

8. The system of claim 1, the portion of the pathway extending on and along at least a portion of the field area extending in a continuous loop around the playing area of the field area.

9. The system of claim 8, the sideline area of the field area having a bench area, and the portion of the pathway extending on and along at least a portion of the field area extending in a continuous loop around the playing area of the field area having a portion positioned between the stadium seating area and the bench area.

10. The system of claim 1, the pathway comprising a rail system on which the vehicle rides.

11. The system of claim 1, further including a guidance system for guiding the vehicle along the pathway.

12. The system of claim 1, further including a driverless vehicle technology guidance system for guiding the vehicle along the pathway.

13. The system of claim 1, further including an electromagnetic guidance system for guiding the vehicle along the pathway.

14. The system of claim 1, the portion of the pathway extending on and along at least a portion of the field area having an elevated portion that raises the vehicle upwardly so that views from the vehicle of the playing area are not obstructed by players, coaches, and/or personnel situated on the sideline area of the field area.

15. The system of claim 1, further including a platform system positioned along the portion of the pathway extending on and along at least a portion of the field area, the platform system being adapted to support the vehicle and the sports fans riding therein when the vehicle is secured thereon, the platform system being adapted to raise upwardly to elevate the vehicle when the vehicle is secured thereon so that views from the vehicle of the playing area are not obstructed by players on the sideline area and to lower the vehicle back to ground level that the vehicle may be released from the platform system and continue on its journey along the pathway.

16. The system of claim 1, the vehicle having a frame, the vehicle having a floor disposed in the vehicle, and a hydraulic system connected to the frame and the floor for elevating the floor of the vehicle upwardly from the frame.

17. The system of claim 1, the vehicle having a floor disposed in the vehicle and upon which sports fans riding in the vehicle may stand, and the vehicle having no seats for the sports fans riding in the vehicle.

18. The system of claim 1, the vehicle having seats mounted therein for sports fans riding in the vehicle to sit in.

19. The system of claim 1, the vehicle having an interior portion for carrying sports fans, the interior portion being closed-off to prevent the sports fans positioned in the interior of the vehicle from speaking or attempting to touch anyone or anything in the sideline area of the field area outside of the vehicle, and the vehicle having a pair of opposed side walls, the viewing means comprising plexiglass that form at least in part both side walls to allow visibility of the sideline area of the field area and the playing area of the field area from the vehicle, regardless of which side of the vehicle is facing the sideline area of the field area and the playing field of the field area.

20. The system of claim 1, the vehicle having an interior portion for carrying sports fans, the interior portion being closed-off to prevent the sports fans positioned in the interior of the vehicle from speaking or attempting to touch anyone or anything in the sideline area of the field area outside of the vehicle, and the vehicle having a side wall facing the playing area of the field area, the viewing means comprising plexiglass that forms at least in part the side wall to allow visibility of the sideline area of the field area and the playing area of the field area from the vehicle.

21. The system of claim 20, the vehicle having at least one microphone positioned outside the vehicle to pick-up sounds of the sideline area of the field area, and a sound system positioned in the vehicle adapted to transmit into the interior of the vehicle sounds picked up by the at least one microphone.

22. The system of claim 1,
the vehicle being an electric or gas-powered motorized vehicle.

23. The system of claim 22,
the vehicle being controlled by a driver, or remotely controlled by personnel not located in the vehicle, or controlled via a computer program.

24. A method, comprising the steps of
providing the system of claim 1,
loading sports fans into the vehicle,
transporting the sports fans on the field area via the vehicle along the portion of the pathway extending on and along at least a portion of the field area while a sporting event is taking place, thereby placing the sports fans riding in the vehicle closer to the players and on-field action than fans sitting in the stadium seating area are,
transporting the sports fans via the vehicle to an exit location, and
unloading the sports fans from the vehicle at the exit location.

25. The method of claim 24, further including the step of stopping at designated locations on the field area in the sideline area of the field area.

26. The method of claim 25,
the vehicle having an interior portion for carrying sports fans,
the interior portion being closed-off to prevent the sports fans positioned in the interior of the vehicle from speaking or attempting to touch anyone or anything in the sideline area of the field area outside of the vehicle,
the vehicle having a pair of opposed side walls, the viewing means comprising plexiglass that forms at least in part both side walls to allow visibility of the sideline area of the field area and the playing area of the field area from the vehicle, regardless of which side of the vehicle is facing the sideline area of the field area and the playing area of the field area,
the vehicle having at least one microphone positioned outside the vehicle to pick-up sounds of the sideline area of the field area, and
the vehicle having a sound system positioned in the vehicle adapted to transmit into the interior of the vehicle sounds picked up by the at least one microphone,
the vehicle being an electric or gas-powered motorized vehicle, and
the vehicle being controlled by a driver, or remotely controlled by personnel not located in the vehicle, or controlled via a computer program.

27. The method of claim 24, wherein the sports fans are loaded into the vehicle at a location beneath the stadium seating area, and wherein the exit location is located beneath the stadium seating area.

28. A system, comprising
a stadium having a field area where an event occurs in the stadium and where performers perform the event,
a stadium seating area substantially surrounding and being adjacent to the field area, the stadium seating area substantially surrounding and being adjacent to the field area being a distinct area from the field area,
a pathway having at least a portion extending on and along at least a portion of the field area, and
a vehicle adapted to move along the pathway,
the vehicle being adapted to transport a plurality of fans situated therein simultaneously on and along the portion of the pathway extending on and along at least a portion of the field area while the event is taking place, and
the vehicle having means for viewing the event and performers performing the event from the field area as the vehicle moves on and along the portion of the pathway extending on and along at least a portion of the field area, thereby placing the fans riding in the vehicle along the portion of the pathway extending on and along at least a portion of the field area closer to the event and the performers performing the event than fans sitting in the stadium seating area are.

29. The system of claim 28, further including,
a stage situated on at least a portion of the field area,
the pathway having a portion extending along at least a portion of the field area adjacent to the stage.

30. The system of claim 29,
the stage having a backstage side,
the pathway being situated such that the portion of the pathway extending on and along at least a portion of the field area has a portion adjacent to the stage at the backstage side of the stage such that a backstage view of the stage is obtained from the vehicle when the vehicle is adjacent to the stage at the backstage side of the stage.

31. The system of claim 29,
the stage having a front side,
the pathway being situated such that the portion of the pathway extending on and along at least a portion of the field area has a portion adjacent to the stage at the front side of the stage such that a front view of the stage is obtained from the vehicle when the vehicle is adjacent to the stage at the front side of the stage.

32. The system of claim 29, the pathway extending from beneath the stadium seating area to the field area adjacent to the stage and then back to beneath the stadium seating area.

33. The system of claim 29,
the pathway comprising a rail system on which the vehicle rides.

34. The system of claim 29,
the vehicle having seats mounted therein for fans riding in the vehicle to sit in.

35. The system of claim 29,
the vehicle being an electric or gas-powered motorized vehicle.

36. A method comprising the steps of
providing the system of claim 29,
loading fans into the vehicle,
transporting the fans on the field area via the vehicle along the portion of the pathway extending on and along at least a portion of the field area adjacent to the stage while an event is taking place, thereby placing the fans riding in the vehicle closer to the event and the performers performing the event than fans sitting in the stadium seating area are,
transporting the fans via the vehicle to an exit location, and
unloading the fans from the vehicle at the exit location.

37. The method of claim 36,
the stage having a front side, and further including the step of temporarily stopping the vehicle loaded with fans adjacent to the stage at the front side of the stage before transporting the fans via the vehicle to the exit location.

38. The method of claim 36,
the stage having a backstage side, and further including the step of temporarily stopping the vehicle loaded with fans adjacent to the stage at the backstage side of the stage before transporting the fans via the vehicle to the exit location.

39. The method of claim 38, the stage having a backstage area, and further including the step of temporarily unloading the fans onto the backstage area of the stage from the vehicle when the vehicle is stopped adjacent to the stage at the backstage side of the stage.

40. The method of claim 36, wherein the fans are loaded into the vehicle at a location beneath the stadium seating area, and wherein the exit location is located beneath the stadium seating area.

* * * * *